(No Model.)
C. L. NORTON.
SAFETY PIN.
No. 244,651. Patented July 19, 1881.
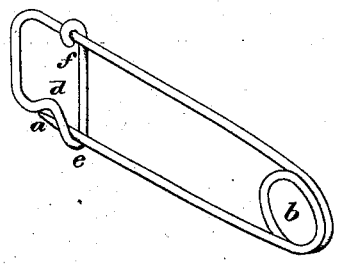
Witnesses.
Chas. L. Norton,
Inventor.
By atty.

UNITED STATES PATENT OFFICE.

CHARLES L. NORTON, OF NEW BRITAIN, CONNECTICUT, ASSIGNOR TO LANDERS, FRARY & CLARK, OF SAME PLACE.

SAFETY-PIN.

SPECIFICATION forming part of Letters Patent No. 244,651, dated July 19, 1881.

Application filed May 2, 1881. (No model.)

*To all whom it may concern:*

Be it known that I, CHARLES L. NORTON, of New Britain, in the county of Hartford and State of Connecticut, have invented a new Improvement in Safety-Pins; and I do hereby declare the following, when taken in connection with the accompanying drawing and the letters of reference marked thereon, to be a full, clear, and exact description of the same, and which said drawing constitutes part of this specification, and represents a perspective view.

This invention relates to an improvement in that class of safety-pins which are made from a single piece of wire, the wire pointed at one end, the other end bent into a hook shape, so as to engage the pin, the wire being bent intermediate between the two ends, to permit the point to engage the hook, and also to produce a spring to hold the point in engagement with the hook, the object of the invention being to strengthen the pin at the hook end; and it consists in continuing the end which forms the hook to the opposite side, and bending it around that side to make firm engagement therewith, as more fully hereinafter described.

A piece of wire of the requisite length is pointed at one end, $a$. Then distant from the point the length of the pin required the wire is coiled to form the spring $b$, thence parallel with the pin to the opposite end it is bent at right angles out beyond the end of the pin, thence returning is bent inward, as at $d$, thence outward, and then at right angles to the pin to form the hook or seat $c$, thence directly across to the opposite side. The end finally bent around over and closed upon the said opposite side, as at $f$, to make firm connection therewith, completes the pin.

I am aware that it is not new to bend the wire at the shield end, so as to form a hook to engage the pin and carry it across to and over the opposite side and again toward the point, so as to form a second hook as an additional shield; but in such construction an engagement is not made with that side opposite the pin to secure the end upon that side, as in this construction.

What I claim, therefore, is—

A safety-pin made from a single piece of wire bent to form the spring $b$, one part pointed to form the pin, the other part bent to form the engaging-hook $c$, the end of the hook part carried across to and bent around over and closed upon the opposite side, so as to make firm connection therewith, substantially as described.

CHARLES L. NORTON.

Witnesses:
C. S. LANDERS,
J. C. ATWOOD.